United States Patent Office 3,063,732
Patented Nov. 13, 1962

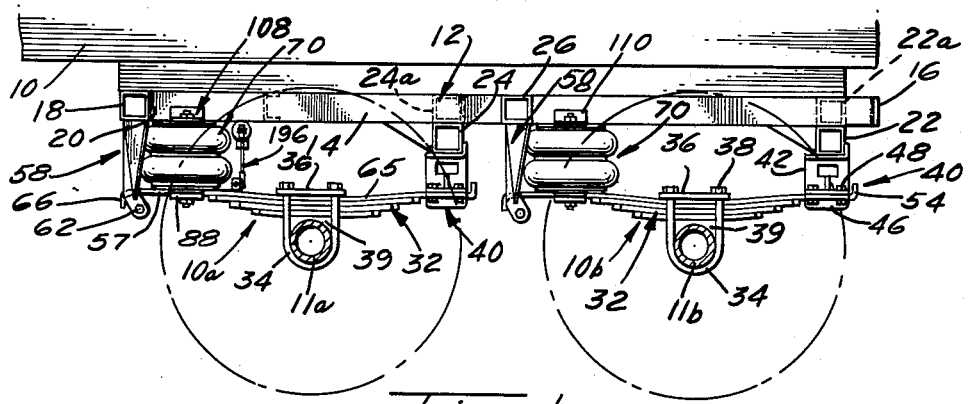

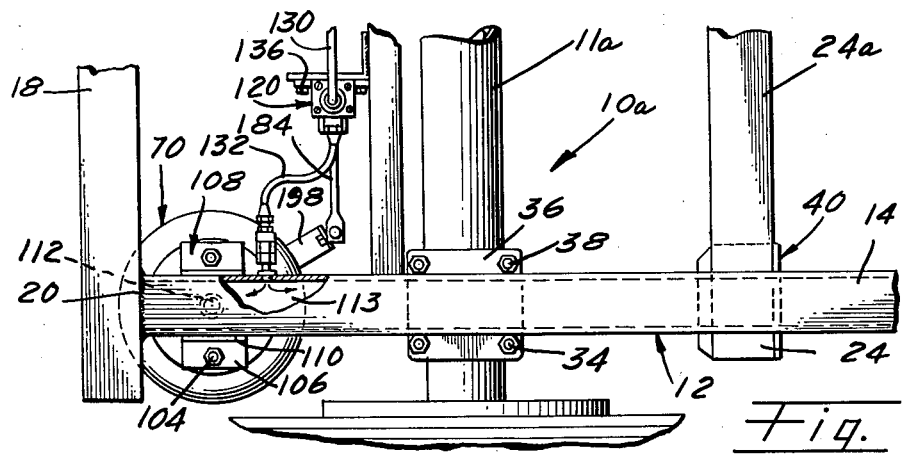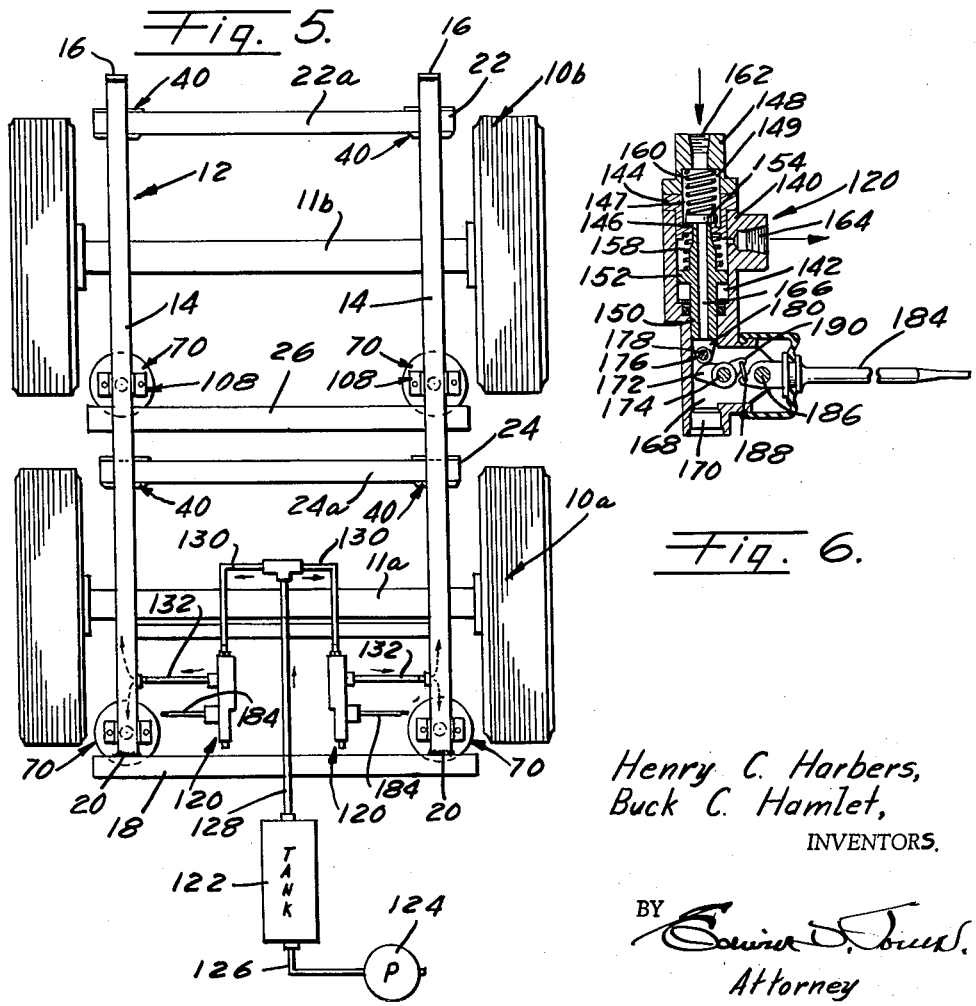

3,063,732
VEHICLE-SUSPENSION MEANS EMPLOYING LEAF AND AIR SPRING ASSEMBLIES IN COMBINATION
Henry C. Harbers, Pasadena, and Buck C. Hamlet, La Puente, Calif., assignors to Western Unit Corporation, Los Angeles, Calif., a corporation of California
Filed Dec. 1, 1958, Ser. No. 777,473
9 Claims. (Cl. 280—124)

This invention relates generally to vehicle-suspension means and relates more particularly to suspension means for vehicles used under widely-varying load conditions.

While the invention has particular utility in connection with the suspension mean for trailers and semi-trailers which may be used with a heavy load, with little or no load, or a partial load, and is shown and described in such connection, it is to be understood that its utility is not confined thereto.

A difficult problem is involved in providing suspension means for vehicles, such as trailers and semi-trailers, which may be operated with loads of widely-varying weights. That is, the vehicle may be operated fully loaded, it may be operated with no load (empty), or it may be operated partly loaded, the weight of which may be of any value between the empty and full-load weights.

Should leaf springs, or the like, be used, which are strong enough to properly support the vehicle when loaded, such springs will be far too stiff for the empty vehicle and the ride thereof will be extremely rough. Should the springs have the proper characteristics to give good riding qualities for an empty vehicle they will not supply proper support for the vehicle under the other various load conditions.

It is, therefore, a purpose of this invention to provide suspension means for vehicles of the above character which will solve the problem of giving proper ride characteristics for such vehicles under all of the above-described operating conditions.

The invention contemplates an arrangement using leaf springs in combination with air-cushioning means under all the various operating conditions. The springs, among other things, control the lateral alignment of the axle and absorb brake torque. The air-cushioning means cooperates with the springs to provide good oscillation and give the vehicle its ride.

Another purpose of the invention is to provide vehicle-suspension means of this character featuring means to vary the supporting action of the air-cushioning and spring means in accordance with the weight of the vehicle load.

Still another purpose of the invention is to provide means of this character to automatically vary the supporting action of the air cushioning means in accordance with the weight of the vehicle load. This is effected by means of a levelling valve which so controls the air pressure in the air-cushioning means as to increase the pressure in accordance with increases in load and vice versa, the valve being actuated in accordance with relative movements of the axle structure and frame structure toward and away from each other.

A further purpose of the invention is to provide means of this character wherein there is delayed action in the valve so that slight movements of the axle and frame structures toward or away from each other will not result in varying the effective pressure in the air-cushioning means.

A still further purpose of the invention is to provide air-cushioning means, for vehicle-suspension means, having a relatively large cushioning capacity.

Another purpose of the invention is to provide a reservoir of such size and capacity as to effect the proper oscillating frequency of the suspension means.

Still another purpose of the invention is to provide means of this character which will eliminate brake hop.

A further purpose of the invention is to provide a brake-suspension system effective for tandem-wheel arrangements.

A still further purpose of the invention is to provide vehicle-suspension means that is simple in construction and operation, and relatively inexpensive to manufacture and service.

The characteristics and advantages of the invention are further sufficiently referred to in connection with the following detailed description of the accompanying drawings which represent one embodiment. After considering this example, skilled persons will understand that many variations may be made without departing from the principles disclosed and we contemplate the employment of any structures, arrangements, or modes of operation, that are properly within the scope of the appended claims.

Referring to the drawings, which are for illustrative purposes only,

FIG. 1 is a side elevational view of a vehicle-suspension means embodying the present invention.

FIG. 2 is an enlarged view of one of the suspension units with portions broken away.

FIG. 3 is a sectional view taken on line 3—3 of FIG. 2.

FIG. 4 is an enlarged partial top plan view of one of the suspension units.

FIG. 5 is a top plan view diagrammatically showing the pneumatic system of the suspension means; and FIG. 6 is an enlarged section view of the levelling valve.

Referring more particularly to the drawings, there is shown a vehicle frame 10 with a two-axle arrangement wherein the axles with their suspension means are arranged in tandem. The front and rear suspension units are indicated respectively at 10a and 10b, the axles of said units being indicated at 11a and 11b.

Beneath the frame 10 and secured thereto by welding or other suitable means is a sub-frame, indicated generally at 12, which includes side members 14 arranged parallel to each other and extending longitudinally of the vehicle. These side members are hollow and are closed at their rear ends by plates 16 which are welded thereto and at the forward end by a transverse end member 18 welded at 20 to the respective front ends of the side members 14, so that these side members are closed at both ends and serve as pneumatic reservoirs, as will be described more particularly hereinafter. The sub-frame also has a transverse member 22 secured to the underside of the members 14 adjacent to the forward ends thereof by welding or any other suitable means, there being a brace 22a above said member 22 and secured to the members 14. Intermediate the ends of the sub-frame there are a pair of transverse members 24 and 26 arranged parallel to each other and spaced apart, there being a brace 24a above said member 24 and secured to the inner side of the members 14. The ends of the transverse members extend outwardly beyond the respective members 14.

As all of the suspension units are the same, a description of but one will be given, this being the front unit 10a shown in FIG. 1.

Referring more particularly to FIG. 1, axle 11a is shown and a leaf spring, indicated generally at 32, which is secured to said axle in the usual well-known manner by a U-bolt 34, the upper ends of which extend upwardly through openings provided therefor in a spring plate 36, and nuts 38 are used to tighten the bolt 34, there being the usual space 39 between the axle and lower side of the spring.

The rear end of the spring 32 is supported in fixed relation to the sub-frame by a spring hanger, indicated generally at 40, which includes an upper part 42 secured to the adjacent end of transverse member 24 by welding or any other suitable means. The upper hangar part 42 is provided with a piece of resilient material 44 which may be of rubber or the like and there is a cap 46 secured to the lower end of the part 42 by means of bolts 48, the cap also being provided with a piece of resilient material 50. The rear end portion 52 of the spring is disposed between the pieces of resilient material 44 and 50 and securely held in position by the cap. There is also an upwardly-turned end portion 54 at the rear of the hanger 40 which prevents the spring from inadvertently being pulled longitudinally from the hanger.

The hanger above described constitutes the subject matter of a separate application, for United States Letters Patent Serial No. 777,474, filed December 1, 1958, now Patent No. 2,991,993.

The front end portion 57 of the spring extends into a spring guide, indicated generally at 58, which has its upper end secured to the transverse member 18. The guide includes side members 60 which are laterally spaced apart and are provided at the lower ends with a bolt 62 limiting downward movement of the adjacent end portion 57 of the spring, said end portion also having a down-turned tip 66, which may serve as a stop by engagement with the bolt 62 should the end portion 57 of the spring rest on the bolt 62 and the axle move downwardly a predetermined distance. At the upper end of the guide there is a downwardly extending web 68 which serves as an upper stop for the spring end 57 under certain emergency conditions. Just behind the guide 58 is an air bellows, indicated generally at 70, said bellows being tubular and of well-known flexible, air impervious material. At the lower end of the bellows there is a peripheral bead 72 sealingly engaged by a rolled peripheral edge part 74 of a plate 76, which closes the lower end of said bellows. The plate 76 rests on the end portion 57 of the top leaf 65 of spring 32, the portion 57 having an opening 80 therethrough for loose reception of a sleeve 82 of greater length than the thickness of spring portion 57. A bolt 84, secured to plate 76 by any suitable means, such as welding or the like, extends through sleeve 82 and the free end of the bolt 84 is provided with a nut 86 which is turned tightly against the lower end of the sleeve 82, said nut being spaced from the lower side of the end portion 57 of the spring, thereby permitting limited movement between the spring and plate 76. At each side of the spring there is a bracket 88 having out-turned parts 90 at the top which are welded or otherwise suitably secured to the plate 76. The brackets 88 extend alongside the adjacent portion of the spring and prevent rotation of the bellows on the spring.

Intermediate the top and bottom of the bellows there is a ring 94 of approximately the same diameter as the diameter of the peripheral part 74 of the plate 76, and which separates the bag into upper and lower parts which are wide open to each other, so that the interior 98 of the bag is substantially a single chamber. By having the bag divided into sections by the ring 94 a more stable and effective functioning is provided.

The upper end of the bag is also provided with an annular bead 96 which is sealingly secured within a turned or rolled peripheral edge portion 98 of a plate 100. On the plate 100 is a second plate 102. These plates are secured together by bolts 104 which also secure said plates to adjacent portions 106 of brackets, indicated generally at 108, which are angular in shape and have parts 110 welded or otherwise secured to the adjacent longitudinal member 14. The plates 100 and 102 are provided with registered openings therein which also register with an opening 111, there being a tube 112 recessed in said aligned openings which provides a connection between the interior of the bellows and the interior chamber 113 defined by the walls of the member 14. The lower end of the tube 112 is provided with an outwardly extending flange 114 which abuts against the underside of the plate 100 and is snugly received in said opening therein provided for said tube. The opening in plate 102 is relatively larger than the opening in plate 100 aligned therewith, and the opening 111 in the member 14 is somewhat smaller than said opening in plate 102. A seal 116 of rubber or other suitable material is disposed on the tube 112 and is provided with an annular groove in which a marginal edge portion about the opening 111 in the member 114 is received.

The rear suspension unit 10b, FIGS. 1 and 5, is mounted to the sub-frame in a manner similar to the mounting of the unit 10a to said sub-frame. Spring hanger 40 of the unit 10b is secured, by welding or the like, to the transverse member 22 which is beneath and welded or otherwise secured to transverse member 22a. Also the bellows of the rear unit 10b is connected to the same member 14 as the bellows of the front unit 10a.

The front and rear suspension units at the opposite end of the axles 11a and 11b are the same as those above described and are secured to the sub-frame in the same manner.

A levelling valve, indicated generally at 120, is provided for each side of the vehicle and said valves are connected to a pressure supply tank or reservoir 122, supplied with fluid pressure by a pump 124 connected to said tank by conduit 126, by means of a main supply conduit 128 and respective branch conduits 130. The levelling valves 120 are also connected with the interior chambers or reservoirs of the respective members 14 by conduits 132.

Valves 120 are attached by screws 136 to the adjacent sub-frame member 14 and are located adjacent the bellows 70 of the front suspension unit.

Each levelling valve is of the same construction and any suitable type may be used. This valve, FIG. 6, includes a body or housing 140 having a longitudinally-extending bore 142 therein. In one end of bore 142 is a valve seal member 144 having a valve seat about a port at the bottom of an enlarged bore 147 and at the outer end of the valve seat member there is a cover 148 having a bore 149 in register with the bore 147, the parts being secured together by any suitable well-known means, such as screws or the like, not shown.

Within bore 142 there is disposed a plunger 150 carrying a piston 152 which is slidable along bore 142. The upper end of the plunger is of reduced diameter and is loosely receivable in the port in the valve seat member and is engageable with a valve disk 154 which is operably disposed in bore 147 and seats at the upper end of the valve seat 146. The plunger is urged downwardly by a spring 158 disposed in the upper end of the cylinder and reacts between the valve seat member and piston 152. The valve member or disk 154 is urged toward the seat 146 by a spring 160 in bores 147 and 149. The cover 148 is provided with an inlet 162 connected with a conduit 130; said inlet communicating with the bore 147, and the body 140 has a port 164 connected to the cylinder 142 between the piston 152 and valve seat member 146, said port also being connected with the chamber of respective member 14 by conduit 132.

Plunger 150 is provided with a longitudinally extending bore 166 adapted to be closed by the valve disk when the upper end of said plunger is in engagement therewith. The lower end of the bore 166 opens into a chamber 168 of the body or housing 140 and there is an exhaust port 170 from said chamber 168 to atmosphere. Within the chamber 168 there is disposed a cam 172 rotatable on a pivot rod 174. The cam 172 engages a roller 176 on a pin 178 carried by a cam follower 180 on the lower end of the plunger 150.

The valve is provided with an actuating lever 184 which extends into the chamber 168 and is pivoted on a shaft 186. The inner end of the lever 184 is connected by a link 188 with an arm 190 of the cam 172 so that movement of the lever on shaft 186 effects movement of said cam to raise or lower the plunger 150.

When the plunger 150 is moved upwardly, the valve disk 154 is raised to permit air to pass from the inlet 162 through the opening defined by the valve seat 146 into the upper portion of the cylinder 142 and through the port 164 which is connected to the interior of the respective member 14 by the conduit 132 and from said member 14 air is transmitted to the respective bellows 70 of both units 10a and 10b of the respective side of the vehicle.

When the plunger 152 is lowered to remove the upper end thereof from engagement with the valve disk 154 and downwardly sufficiently to provide a connection with the upper end of cylinder 142 and passage 166, air will escape from the member 14 into the upper end of the cylinder 142, through the passage 166 into the chamber 168 and thence to atmosphere by way of the exhaust port 170.

The lever 184 of the valve is connected by an adjustable link 196, including a rod 196a and a sleeve 197 with a bracket 198 which is secured to the spring adjacent the bellows 70 thereof. The bracket may be secured to the spring by any suitable means, such as screws or bolts, not shown, and it is to be noted that the link 196 has its ends pivotally or otherwise operably connected to the outer end of lever 184 and to the bracket 198 respectively. The means for adjusting the length of the link 196 comprises the sleeve 197 which is internally threaded and into which an externally threaded end portion of the rod 196a is secured.

When the equipment is installed, the valve 120 is so adjusted by varying the length of the link 196 as to provide the proper pressure within the bellows 70. This pressure is such that the end portion 66 of the leaf spring 32 is disposed at the intermediate point between the bolt 62 and the web 68, so that this end of the spring floats. Thereafter when there is an increase in load in the vehicle there is relative movement of the spring end portion 66 and sub-frame toward each other so that the lever 184 of the valve is moved upwardly to raise plunger 150 and valve disk 154 so as to admit additional air into the member 14 to compensate for this additional load and to maintain the spring end 64 in its present floating condition. The greater the load, of course, the more pressure there is supplied to the bellows 70.

Upon the reduction of the load the lever 184 is moved in the opposite direction so that the valve disk 154 seats on its seat 146 and the upper end of the plunger moves away from said disk to be connected with the upper end of the cylinder 142. There is then a bleeding off of the pressure in the bellows 17 of the units 10a and 10b and member 14 in accordance with the reduction in said load. Thus there is automatically provided the proper relationship of sprnig and pneumatic suspension in accordance with the load of the vehicle.

Should there be a failure of the pneumatic system or the pressure therein, the spring end 64 may engage the web 68 and the vehicle hauled or driven home on the springs alone.

It is thought that the invention and many of its attendant advantages will be understood from the foregoing description and it is thought that it will be apparent that various changes may be made in the form, construction and arrangement of the parts of the invention without departing from the spirit and scope thereof or sacrificing all of its material advantages, the form herinbefore described being merely by way of illustrating one embodiment.

What we claim is:

1. Suspension means for vehicles having a main frame, comprising: a sub-frame secured to the main frame and including a pair of hollow members extending longitudinally of the main frame and providing a pair of pneumatic chambers; a pair of transverse axles arranged in tandem; a leaf spring for each end of each axle, each spring comprising a plurality of leaves, including a top leaf; means securing the central portion of each spring to the respective adjacent axle end portion; respective spring-hanger means attached to the sub-frame and securing the rear end of each spring in fixed relationship to said sub-frame; guide means for the forward end of each spring, said guide means being connected to the sub-frame and having spaced side members between which a free front end portion of said top leaves of respective springs are disposed and held against lateral displacement, said guides also having vertically spaced stop means above and below the spring leaf ends between said members to limit upward and downward movements of said leaves; a pneumatic, expansible bellows having the bottom end secured to said top leaf end of each spring adjacent to the guide means therefor; means securing the upper ends of the bellows of adjacent axle ends to a respective longitudinal sub-frame member; means connecting the interior of the bellows at respective sides with said respective sub-frame members; a source of pneumatic pressure; means connecting said source of pressure with said chambers; a levelling valve controlling pressure fluid to respective pneumatic chambers of said sub-frame members, said levelling valve being attached to the sub-frame and having a control lever; means, adjustable as to length, operably connecting the control lever with the front end portion of one of the leaf springs at one side of the sub-frame, said valve being so adjusted that the front end portion of each spring at one side of the sub-frame floats between the upper and lower stop means therefor, said levelling valve operating to provide an increase in pressure to the respective chamber and bellows connected therewith upon an increase in load of the vehicle and vice versa.

2. Suspension means for vehicles having a main frame, comprising: a sub-frame secured to the main frame and including a pair of hollow members extending longitudinally of the main frame and providing a pair of pneumatic chambers; a pair of transverse axles arranged in tandem; a leaf spring for each end of each axle, each spring comprising a plurality of leaves, including a top leaf with an extended front end portion; means securing the central portion of each spring to the respective adjacent axle end portion; respective spring-hanger means attached to the sub-frame and securing the rear end of each spring in fixed relationship to said sub-frame; guide means for controlling vertical movement of the front end of each spring, said guide means being connected to the sub-frame and hold the front end portions of said springs against lateral displacement, said guides also having stop means below said spring leaf ends to limit downward movement of said leaves; a pneumatic, expansible bellows for each spring having the bottom end secured to the top leaf end of each spring adjacent to the guide means therefor; means securing the upper ends of the bellows of adjacent axle ends to respective longitudinal sub-frame members; means connecting the interior of the bellows at respective sides with said respective sub-frame members; a source of pneumatic pressure; means connecting said source of pressure with said pneumatic chambers; a levelling valve controlling pressure fluid to respective chambers of said sub-frame members, said levelling valve being attached to the sub-frame and having a control lever; means, adjustable as to length, operably connecting the control lever with the front end portion of one of the leaf springs at one side of the sub-frame, said valve being so adjusted that the front end portion of each spring at one side of the sub-frame floats above said lower stop means therefor, said levelling valve operating to provide an increase in pressure to the respective chamber and bellows connected therewith upon an increase in load of the vehicle and vice versa.

3. Suspension means for vehicles having a main frame, comprising: a sub-frame secured to the main frame and including means defining a pair of pneumatic chambers; a pair of transverse axles arranged in tandem; a leaf spring for each end of each axle; means securing the central portion of each spring to the respective adjacent axle end portion; respective spring-hanger means attached to the sub-frame and securing the rear end of each spring in fixed relationship to said sub-frame; guide means for the forward end of each spring, said guide means being connected to the sub-frame and having spaced side members between which a free front end portion of respective springs are disposed and held against lateral displacement, said guides also having stop means below the front ends of said springs to limit downward movement of said spring ends; a pneumatic, expansible bellows having the bottom end secured to the front end of each spring adjacent to the guide means therefor; means securing the upper ends of the bellows at one side of the sub-frame to said sub-frame; means connecting the interior of the bellows at one side to respective pneumatic chambers; a source of pneumatic pressure; means connecting said source of pressure with said chambers; a levelling valve controlling pressure fluid to respective chambers of said sub-frame members, said levelling valve being attached to the sub-frame and having a control lever; means operably connecting the control lever with one of the leaf springs at one side of the sub-frame, said valve being so adjusted that the front end portion of each spring at one side of the sub-frame floats above the stop means limiting downward movement of the front spring end, said levelling valve operating to provide an increase in pressure to the respective chamber and bellows connected therewith upon an increase in load of the vehicle and vice versa.

4. Suspension means for vehicles having a main frame, comprising: a sub-frame secured to the main frame and including means defining a pair of pneumatic chambers; a pair of trensverse, parallel axles arranged in tandem; a leaf spring for each end of each axle, means securing the central portion of each spring to the respective adjacent axle end portion; respective spring-hanger means attached to the sub-frame and securing the rear end of each spring in fixed relationship to said sub-frame; guide means for the forward end of each spring, said guide means being connected to the sub-frame and receiving a front end portion of said spring and holding same against lateral displacement, said guides also having stop means below the front end of said spring to limit downward movement thereof; a pneumatic expansible means for each spring and having one end secured to the front end of each spring; means securing the other end of each expansible means to said sub-frame; means connecting the interior of said expansible means of each side to a respective pneumatic chamber; a source of pneumatic pressure, means connecting said source of pressure with said chambers; a levelling valve controlling pressure fluid to respective chambers, said levelling valve being operably connected beween said sub-frame and one of the leaf springs at one side of the sub-frame, said valve controlling pressure to said expansible means so that the front end of each spring at one side of the sub-frame floats above the stop means limiting downward movement of said front end of said spring, said levelling valve operating to provide an increase in pressure to the respective chamber and bellows connected therewith upon an increase in load of the vehicle and vice versa.

5. Suspension means for vehicles, comprising: a sub-frame adapted to be secured to a vehicle and including a pair of hollow frame members defining pressure chambers independent of each other; a pair of transverse axles arranged in tandem; a leaf spring for each end of each axle; means securing the central part of each spring to the respective axle end; respective spring-hanger means attached to said sub-frame and securing the rear end of each spring in fixed relation thereto; guide means for the forward end of each spring, said guide means being connected to the sub-frame and having spaced side members between which the free forward end portion of the respective spring is received and held against lateral displacement, said guides also having at least a bottom stop limiting downward movement of said forward spring end; a pneumatic bellows for each spring and having the lower end secured to the forward end portion of its spring, the other end of said bellows being secured to the sub-frame and internally connected to the said pressure chambers, the pair of bellows at each side being connected with a respective pressure chamber; a source of pressure; means connecting said source of pressure with the pressure chambers; and a levelling valve controlling the pressure fluid to respective chambers; each of said levelling valves being operably connected to the sub-frame and the forward end of one of the springs at its respective side of the sub-frame, said levelling valve being adapted to admit more pressure fluid to the respective pressure chamber when there is relative movement of the sub-frame and spring end toward each other and vice versa.

6. In combination, a self-contained pre-adjusted suspension assembly adapted to be rigidly secured as a unit to vehicle frames and comprising a sub-frame adapted to be secured to a vehicle frame; a pair of axles arranged in tandem; a leaf spring for each end of each axle; means operably securing parts of each spring to respective axle ends and to said sub-frame, each spring having a free end portion mechanically disconnected from the adjacent portion of said sub-frame; a flexible-walled pneumatic bellows for each spring having its opposite ends operably secured to said free end portion thereof and to said sub-frame, the bellows at respective sides being pneumatically connected together by means of said sub-frame; a levelling valve for each side of the sub-frame adapted to control pressure fluid only to the bellows thereof, said valve being so arranged as to be responsive to variations in the weight on the sub-frame so as to supply more pressure to said bellows with an increase in said weight and to relieve the pressure with a reduction of said weight; and guide means located laterally to one side of said flexible-walled bellows with its upper end secured rigidly to said sub-frame at a point spaced closely beside the upper end of said bellows, said guide means including upper and lower stops for said spring end, and said bellows being removable for servicing independently of said guide means.

7. Suspension means for vehicles having a main frame, comprising: a sub-frame secured to said main frame; a transverse axle; a leaf spring for each end of said axle; means securing the central part of each spring to the respective axle end; respective spring-hanger means attached to said sub-frame and securing the rear end of each spring in fixed relation thereto; guide means for the forward end of each spring, said guide means being connected to the sub-frame and having spaced side members between which a forward end portion of the respective springs are received and held against lateral displacement, said guide means also having at least a bottom stop means limiting downward movement of said forward end portion of the springs; a pneumatic bellows for each spring, each bellows having one end secured to the forward end portion of its respective spring, the other end of said bellows being secured to the sub-frame; a source of pneumatic pressure; means connecting said source of pressure with said bellows; and a levelling valve for the respective bellows, each of said levelling valves being operably connected to said sub-frame and the forward end of the respective spring to which the bellows controlled by said valve is mounted, said levelling valve being adapted to provide an increase in pressure to its bellows upon an increase in vehicle load and vice versa so that the front end of said springs floats in said guide means.

8. Suspension means for vehicles, comprising: a sub-frame adapted to be secured to a vehicle and including a pair of hollow frame members defining pressure chambers independent of each other; a pair of transverse axles arranged in tandem; a leaf spring for each end of each axle; means securing the central part of each spring to the respective axle end; respective spring-hanger means attached to said sub-frame and securing the one end of each spring in fixed relation thereto; guide means for the other end of each spring, said guide means being connected to the sub-frame and having spaced side members between which the free end portion of the respective spring is received and held against lateral displacement, said guides also having at least a bottom stop limiting downward movement of said forward spring end; a pneumatic bellows arranged in series with each spring between same and the sub-frame, said bellows being spaced laterally to one side of said guide means and connected to said spring and to said sub-frame independently of said guide means for convenience in servicing said bellows without disturbing any part of said guide means, the bellows on one side being pneumatically connected together; a source of pressure; means connecting said source of pressure with said bellows and including levelling valve means controlling the pressure fluid to respective bellows, each levelling valve means being operably connected to the sub-frame and one of the springs at its respective side and responsive to the load of the vehicle to provide pressure in the bellows in accordance to said load.

9. A unitary wheel-supported suspension assembly having a pair of parallel axles arranged in tandem and adapted for use in supporting the rear end of a heavy-duty cargo carried on highways and adapted to be attached to a cargo carrier as a pre-tested unitary assembly while the cargo carrier is in the field, said suspension assembly having a plurality of elongated parallel rigid members arranged crosswise of the opposite ends of said axles and adapted to be secured to the side members of a cargo carrier frame, a pair of leaf springs beneath and extending lengthwise of each of said rigid members for resiliently supporting the dead load of the cargo carrier, having limited resiliency means securing one end of each of said leaf springs to an overlying adjacent portion of the associated one of said rigid members, the other end of each of said leaf springs being free to flex vertically toward and away from said rigid members, rigid spring leaf guide means secured to said rigid members astride said free ends of said leaf springs and including upper and lower stop means for limiting extreme flexing of the free ends of said leaf springs as well as means for confining the flexing movement of said leaf springs to a vertical plane, means rigidly securing the mid-portions of each of said leaf springs to a respective one of said axles, means cooperating with said leaf springs for resiliently supporting live loads placed on the cargo carrier and including air-inflatable flexible bellows interposed one between each of the free ends of said leaf springs and the overlying portion of one of said rigid members, separate automatic leveling valve means located on each side of said suspension assembly in communication with each of the two air-inflatable bellows on that side of the assembly and including operating connections between said associated rigid member and the free end of one of said leaf springs for admitting pressurized air to an associated pair of said air bellows as necessary to maintain the free ends of said springs positioned between and out of contact with said upper and lower stop means irrespective of different live loading conditions of the cargo carrier, means for supplying pressurized air to each of said leveling valve means, said suspension assembly including an air flow connection between the two air bellows on a given side of the assembly whereby the associated single leveling valve means is effective to control the air pressure conditions in a pair of said air bellows and whereby any tendency of unequal loading on the springs on one side of the suspension assembly is quickly equalized, and said air inflatable bellows providing the sole load bearing connection between said rigid members and the free ends of said leaf springs.

References Cited in the file of this patent
UNITED STATES PATENTS

| | | |
|---|---|---|
| 1,104,294 | Erickson | July 21, 1914 |
| 1,258,355 | Mullen et al. | Mar. 5, 1918 |
| 1,474,656 | Van Nattan | Nov. 20, 1923 |
| 1,516,004 | Eckrode | Nov. 18, 1924 |
| 1,667,275 | Warhus | Apr. 24, 1928 |
| 1,747,902 | Marcum | Feb. 18, 1930 |
| 1,913,698 | Clement | June 13, 1933 |
| 1,928,860 | Marcum | Oct. 3, 1933 |
| 2,284,646 | Eidel | June 2, 1942 |
| 2,361,575 | Thompson | Oct. 31, 1944 |
| 2,771,303 | Frazier | Nov. 20, 1956 |
| 2,827,282 | Weiss | Mar. 18, 1958 |
| 2,864,454 | LaBelle | Dec. 16, 1958 |
| 2,869,890 | Benning | Jan. 20, 1959 |
| 2,902,275 | Hammond | Sept. 1, 1959 |
| 2,913,252 | Norrie | Nov. 17, 1959 |
| 2,970,847 | Hammond | Feb. 7, 1961 |